United States Patent
Pintsov et al.

(10) Patent No.: US 6,832,130 B2
(45) Date of Patent: Dec. 14, 2004

(54) METHOD AND SYSTEM FOR AUTOMATED DOCUMENT PROCESSING

(75) Inventors: Leon A. Pintsov, West Hartford, CT (US); Patrick M. Brand, Southport, CT (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/861,659

(22) Filed: Jun. 4, 2004

(65) Prior Publication Data

US 2004/0220695 A1 Nov. 4, 2004

Related U.S. Application Data

(62) Division of application No. 10/310,102, filed on Dec. 4, 2002, now Pat. No. 6,775,590.

(51) Int. Cl.[7] .......................... G06F 7/00; B42D 15/00; G06K 9/54; G06K 9/60
(52) U.S. Cl. ...................... 700/224; 700/226; 700/227; 229/92.8; 382/306
(58) Field of Search ................................. 700/223, 224, 700/225, 226.227; 229/92.8; 382/306; 209/564, 583, 584; 283/79

(56) References Cited

U.S. PATENT DOCUMENTS

| | | |
|---|---|---|
| 5,169,061 A | 12/1992 | Buescher |
| 5,420,403 A | 5/1995 | Allum et al. |
| 5,459,670 A | 10/1995 | Johnson et al. |
| 5,749,473 A | 5/1998 | Yamashita et al. |
| 5,901,855 A | 5/1999 | Uno et al. |
| 5,990,438 A | 11/1999 | Yamashita et al. |
| 6,003,902 A * | 12/1999 | Petkovsek .................. 229/92.8 |
| 6,054,666 A | 4/2000 | Yamashita et al. |
| 6,089,613 A * | 7/2000 | Petkovsek ..................... 283/79 |
| 6,107,589 A | 8/2000 | Yamashita et al. |
| 6,112,193 A | 8/2000 | Dlugos et al. |
| 6,166,346 A | 12/2000 | Yamashita et al. |
| 6,173,273 B1 | 1/2001 | Herbert |
| 6,223,168 B1 | 4/2001 | McGurl et al. |
| 6,260,762 B1 | 7/2001 | Lohmann |
| 6,459,953 B1 | 10/2002 | Connelly et al. |

FOREIGN PATENT DOCUMENTS

US 2002/016951 11/2002

* cited by examiner

*Primary Examiner*—Gene O. Crawford
(74) *Attorney, Agent, or Firm*—Brian A. Lemm; Angelo N. Chaclas

(57) ABSTRACT

A business reply mail piece and associated processing system that allows information contained within business reply mail to be scanned and interpreted before the business reply mail reaches its ultimate destination is provided. A machine-readable block of control information that instructs computer-driven actuators what to do with the business reply mail document itself, its digital image (or parts of thereof) and the data elements contained in the document, based on selections made by the recipient, is provided on the business reply mail piece. A scanner module scans the business reply mail piece to read the selection made by the recipient and the corresponding instructions from the block of control information. A control module interprets the data to provide instructions for the processing of the business reply mail piece based on the recipient's selection.

22 Claims, 6 Drawing Sheets

METHOD AND SYSTEM FOR AUTOMATED DOCUMENT PROCESSING

This application is a divisional of application Ser. No. 10/310,102, filed Dec. 4, 2002, now U.S. Pat. No. 6,775,590, which is hereby incorporated by reference.

FIELD OF THE INVENTION

This invention relates generally to document processing systems, and more particularly, to a system and method for processing business reply mail in an efficient manner to automatically interpret and act upon the information contained therein.

BACKGROUND OF THE INVENTION

Paper-based or electronic documents are extensively used as media for providing information. The purpose of such information is manifold. Most typical purposes for the information are to inform a human reader or to cause a certain action or actions by the reader. If a computer is utilized to interpret paper-based or electronic documents, with the desire of having the computer execute one or more actions required by the document, the computer must be capable of performing at least two functions. First, the computer must be able to "read" the document, i.e., accept and manipulate the information presented in a computerized format. Second, the computer must be able to decide what action is required based on the information presented. The decision as to any actions required based on the information contained in the document requires computer interpretation of the data contained in the document.

With respect to reading the document, electronic documents typically already exist in a form manipulable by the computer. The task of converting paper-based documents into a computerized format, i.e., information that can be manipulated by a computer, involves scanning and character recognition operations. For either type of document, however, the task of interpretation of the information for the purpose of subsequent action is a difficult one since computers do not possess an intrinsic understanding of the purpose of the information. Many attempts to alleviate the task of interpretation have been proposed. For example, Electronic Data Interchange (EDI) techniques were created to include interpretation of the data contained in the document together with the data itself. Similarly, modern computer languages, inspired by the proliferation of network computing, e.g., the Internet and the World Wide Web, such as, for example, HTML and XML, are designed to enable standard representation and interpretation of data by computers.

In many applications, however, the interpretation of data in the document may depend on several conditions that could not be completely specified at the time when the document was created. In mailing applications, mail items are frequently sent by mailers to their intended recipients in order to require or solicit a payment or a purchase. For example, many companies and private concerns use business reply mail to solicit information and responses from the recipients of the business reply mail. As such, business reply mail has a wide variety of uses and is often customized depending upon the needs of the sender. A few examples of the uses for business reply mail are subscription solicitations, information request responses, proxy statement responses, remittance documents (invoices for payment due) and the like. In these cases, the mailer frequently includes a business reply envelope (BRE) or business courtesy envelope (BCE) and a reply form or slip that must be marked by the recipient before inserting it into BRE or BCE and mailing it back to the sender. Alternatively, the reply form could be integral with the BRE, such as, for example, a postcard or the like. Typically, the reply form is provided with a plurality of choices from which the recipient must select and mark the reply form to indicate the selection made. Thus, any computer interpretation of the reply form necessarily depends on where the form has been marked by the recipient. As such, it is not possible to use conventional data interpretation techniques.

In many instances, companies must utilize manual techniques for the interpretation of data when handling business reply mail and associated data entry. The result is a time consuming and costly process that is susceptible to human error. For example, in credit card or other payment remittance processing applications, bills are usually sent to payers by mail. A bill contains a form or slip and a BCE. The payer is typically provided with three options for payment: (i) payment in full, (ii) a minimum payment amount, or (iii) some other payment amount. The choices are presented on the slip in a written description together with a space for the payer to indicate, by marking with some type of mark such as, for example, a check mark, the desired selection. The payer is expected to write a check or include a credit card number on the slip (depending on the application) to execute actual transfer of funds from the payer's account to the payee's account. The payer normally inserts the marked slip and a check (if required) into the BCE and places the BCE into the mail stream for return to the sender-specified mailing address. Several days after the BCE is deposited in the mail stream, the BCE arrives at the sender-specified return address, where it is subjected to normal remittance processing. First, the BCEs are opened and the slips and checks are extracted. The checks and slips are scanned and sorted by specialized computer-driven equipment and totals are computed. The checks are then submitted to a financial institution for a clearing process where the effective transfer of funds takes place through the Federal Reserve Bank check clearing system.

Similarly, in many instances BREs are utilized in promotional mailings that offer prospective customers multiple choices in selecting merchandise offered by the party making the promotional mailing, e.g., a merchant. Promotional mail normally includes a form or slip and a BRE. Alternatively, of course, the form could be integral with the BRE, as in the case of a return postcard or the like. The recipients are requested to mark the form in an appropriate manner, should they desire to acquire the offered merchandise, insert the recipient-marked form into the BRE, and return the BRE to the mailer through the mail stream. Typically, the return mailing address is preprinted on the BRE. Several days after the BRE is deposited in the mail stream, the BRE is received back by the party making the promotional mailing. Upon receipt of the BRE, the merchant or its agent opens the BRE to extract the contents and subject the contents to a process similar to remittance processing, namely, forms are scanned, the scanned information is interpreted, and the information is sent for fulfillment to the appropriate warehouses or agents. Again, the process is time consuming and costly.

Other applications where automatic interpretation of documents is important include health-care and legal applications, particularly when original documents are paper-based and intended for both human and machine consumption.

In each of the situations described above, there are several shortfalls. For example, the entire process of returning and processing a BRE or BCE is costly and time consuming, and requires multiple redundant operations, including, for example, multiple quality control checks, scans and key entries, since errors must be eliminated as much as possible. The time delays associated with receiving and processing such documents can also have a negative financial impact on the sender of the bill or the promotional mailing, e.g., the merchant. For example, it is not until several days after the BRE or BCE is placed into the mail stream that the information from the BRE or BCE can be processed (after receipt by the merchant) and acted upon. Early interpretation and action upon the information on the form included with BRE or BCE could result in financial benefits to the merchant. For example, if a BRE or BCE containing payment or order information could be scanned and interpreted before they reach their ultimate destination address, it would provide for significantly expedited processing as well as processing cost reduction. Expedited processing can result in an earlier transfer of funds to the merchant, thus lowering costs for the merchant.

Therefore, there exists a need for improved systems capable of efficiently processing business reply mail to rapidly acquire the information that each reply mail piece contains and initiate appropriate follow up activity.

SUMMARY OF THE INVENTION

The present invention provides a reply mail processing system that allows information contained within business reply mail to be scanned and interpreted before the business reply mail reaches its ultimate destination, thereby significantly expedited processing as well as reducing processing cost of the business reply mail.

In accordance with the present invention, a machine-readable block of control information that instructs computer-driven actuators what to do with the business reply mail document itself, its digital image (or parts of thereof) and the data elements (interpreted as computerized codes, e.g., ASCII codes) contained in the document, based on selections made by the recipient, is provided on the business reply mail. A business reply mail processing system includes a scanner module and a control module, capable of interpreting the scanned data, in operative communication with the scanner module. A communication unit is in operative communication with the control module. Preferably, the reply mail processing system of the present invention will be installed at several mail processing stations, such as, for example, at mail induction centers where mail scanning and processing equipment is employed by postal operators and private carriers.

The machine-readable block of control information, referred to as machine-readable control information (MRCI), is created by the party that is sending the business reply mail, e.g. the mailer, such as, for example, a bank, brokerage house, merchant, etc., and imprinted or otherwise attached either to the business reply mail itself or to a business reply envelope (BRE or BCE) containing the slip or form intended to be completed by the recipient. The MRCI and areas for the recipient to indicate one or more selections are situated in such a manner that they can be scanned and automatically interpreted during all phases of the business reply mail life cycle. The MRCI can contain information related to one or more of the recipient, the sender, the content of the business reply mail and one or more sets of instructions associated with the selection areas intended for marking by the recipient. Optionally, the information may be encrypted. In general, the MRCI contains all necessary instructions for the processing agent, e.g., the postal service, to scan and forward information conditioned by a choice made by the recipient to the sender or the sender's agent. This information enables the sender to automatically process actions requested by the recipient without additional human interaction.

According to the present invention, when the business reply mail piece is received by the postal operator or private carrier for induction into the mail stream, the MRCI and any selections made by the recipient are scanned by the scanner. The information is passed to the control module for interpretation. Based on the selection made by the recipient, the control module will perform the appropriate set of instructions included in the MRCI for processing the business reply mail piece. Appropriate data elements, obtained from the MRCI based on the recipient's selections, can be electronically sent, via the communication unit, to the sender or the sender's agent. Thus, the sender, or remittance processing agent of the sender, can receive all of the information, in computerized format, required for efficient processing of the business reply mail long before the physical mail item, i.e., the business reply mail piece, is received through the normal mail delivery process. This saves the cost of additional manual or automatic processing of the physical mail piece, as well as allowing for significant float benefits to the mailer (merchant) due to the reduced processing time, at almost no additional cost to the mailer or postal operator. The physical mail piece can be archived and retrieved, if necessary, to facilitate potential dispute resolution between mailers and recipients.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
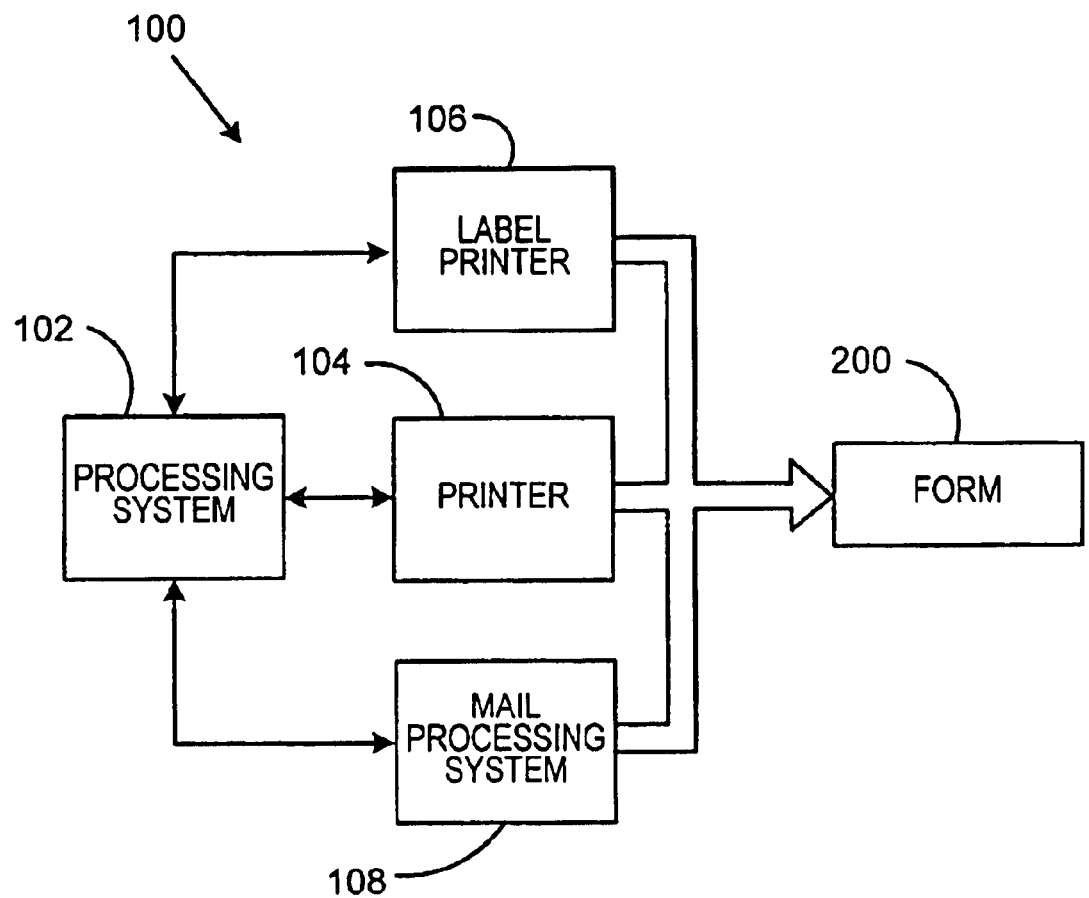
FIG. 1 is a block diagram of a system for creating and printing business reply mail pieces having an MRCI according to the present invention.

Referring to FIG. 1, a system 100 for creating and printing business reply mail pieces having an MRCI according to the present invention is generally shown. The term business reply mail, for purposes of this specification, includes any portion of a mail piece that a recipient returns to the sender, such as, for example, a BRE or BCE and any documents or forms intended for insertion therein, postcards, or the like. The system 100 includes a processing system 102, such as, for example, a general or special purpose computer or the like, that is operatively coupled to one or more peripheral devices including, for example, a general purpose printer 104, or a label printer 106. A mail processing system 108 could also be coupled to processing system 102. Mail processing system 108 could be, for example, a postage meter, a mailing machine, or a mail assembly machine such as an inserter. Alternatively, of course, processing system 102 could be integral with the mail processing system 108. In accordance with the present invention, processing system 102, in conjunction with one or more of the peripheral devices 104–108, can be utilized to create a portion or all of a business reply mail piece, including a form 200, as described below.

Figure 2:
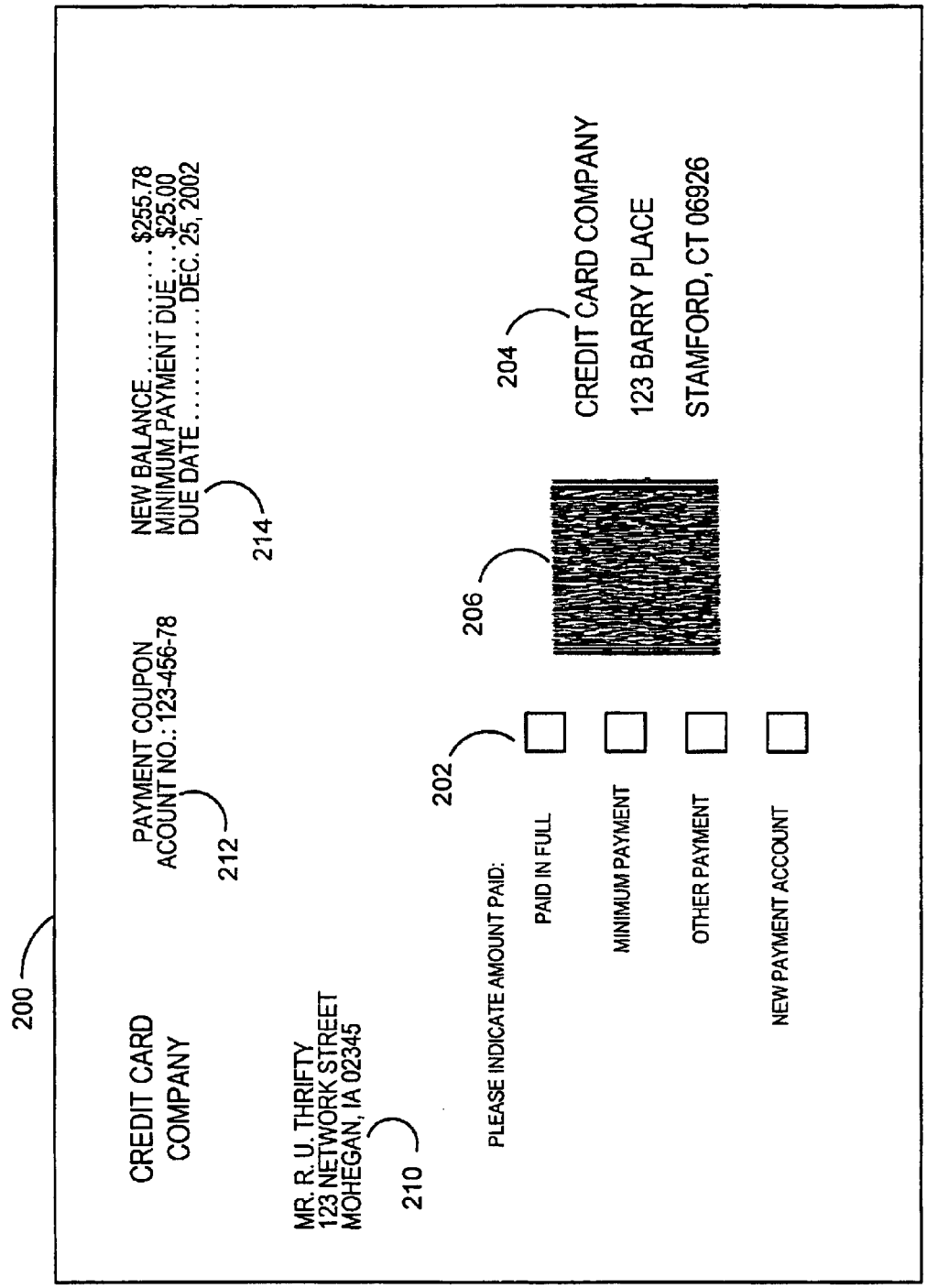
FIG. 2 illustrates an example of a portion of a business reply mail piece generated by the system shown in FIG. 1.

As previously noted, uses for business reply mail can include, for example, subscription solicitations, information request responses, proxy statement responses, remittance documents (invoices for payment due) and the like, sent by the mailer, also referred to as the sender, to a recipient. The sender frequently includes a business reply envelope (BRE) or business courtesy envelope (BCE) and a reply form or slip that must be marked by the recipient before inserting it into the BRE or the BCE and mailing it back to the sender. Alternatively, the reply form could be integral with the BRE, such as, for example, a postcard or the like. FIG. 2 illustrates a form 200 generated by the system 100 shown in FIG. 1 for use with a business reply mail piece according to the present invention. The form 200 is an example of a remittance document sent by a credit card company. It should be understood, of course, that the invention is not so limited and can be used with any type of business reply mail.

As shown in FIG. 2, form 200 includes the address of the recipient (account holder) 210, the credit card account number 212, and information 214 related to the amount due, the minimum amount due, and the due date. Form 200 also includes the destination address 204 of the sender, i.e., the address to which the form 200 will be returned by the recipient. Form 200 further includes one or more boxes or selection areas 202 to be marked by the recipient based on a selection made by the recipient. The marks made by the recipient can be applied by hand, typed or printed, and reflect the recipient's choice, or choices, concerning options offered by the sender. As illustrated in FIG. 2, the recipient is provided with four choices based on the type of payment to be made. Each of the choices is provided in human readable text adjacent to a respective selection area 202. Thus, on form 200, the recipient can select to pay the invoice in full, make the minimum payment due, make some other payment amount, or provide a new payment account number that has not been previously registered with the sender. Other options may also be provided to the recipient. For example, if the recipient has multiple payment accounts, such as, for example, multiple checking accounts, the recipient could be provided with an option to make a payment from either of the accounts. For security purposes, each account could be identified only by the last four digits of the account in the human readable text provided adjacent to selection area 202. Should the recipient wish to register a new payment account, an option to provide a new payment account could be provided as illustrated in FIG. 2. It should be understood, of course, that the options provided to the recipient can vary greatly based on the subject matter of the form 200, and are not limited to those as described above. For example, if the form 200 is related to a purchasing solicitation, the recipient could have several choices related to the type of product desired to be purchased, payment option, etc. In addition, while form 200 illustrates four possible options from which the recipient can select, the present invention is not so limited and any number of options can be provided. The number of options capable of being presented to the recipient may only be limited based on the physical space on the form 200 and possibly the amount of instructions corresponding to each choice (as described below).

According to the present invention, the form 200 is also provided with a machine-readable block of control information 206, hereinafter referred to as machine-readable control information (MRCI). MRCI 206 is created by the party that is sending the business reply mail, e.g. the mailer or merchant, and imprinted on or otherwise attached to the form 200. The MRCI 206 includes instructions corresponding to each possible selection provided to the recipient that are required for processing the form 200 according to the present invention. Specifically, the MRCI 206 provides instructions related to processing of the business reply mail piece containing the form 200 when returned by the recipient, its digital image (or parts of thereof) and the data elements associated with the form 200 or the reply mail piece. Preferably, the MRCI 206 is formatted as a two dimensional barcode, such as, for example, the well known PDF 417 format from Symbol Technologies Corporation, or any other suitable, sufficiently dense, printed, scanable form of data representation, such as, for example, data matrix.

The MRCI 206 contains information related to one or more of the recipient, the sender, the content of the business reply mail and one or more sets of instructions associated with the selection areas 202 intended for marking by the recipient. Preferably, the MRCI 206 contains information related to all data elements to be captured from the form 200 or mail piece containing the form 200, including, for example, such elements as one or more of the marks made by the recipient in area 202, the recipient's return mailing address 254 (FIG. 3), the destination address 204 and the evidence of postage payment. MRCI 206 also preferably includes any data elements to be obtained from the system processing the form 200 (described below with respect to FIG. 4) such as, for example, a date/time stamp when the system scans the form 200, the identity and location of the processing system and other similar elements. MRCI 206 further preferably includes an identification of the recipient as assigned by the sender. For example, in the context of financial or marketing applications, such identification could be one or more payment account numbers the recipient has registered with the sender, or the recipient's credit card number. MRCI 206 further preferably includes an identification of the form 200, an electronic address of the sender or its agent (e.g., an address of a server associated with the sender or agent), such as, for example, the e-mail address of a remittance processing agency used by the sender, and one or more sets of instructions specifying what has to be done with the mail piece containing the form 200, its information content, its image and its attributes and parameters (data elements) as a function of the recipient's indicated responses. MRCI 206 can also include an identification of the transaction associated with the form 200. MRCI 200 also preferably includes parsing information related to the form 200, such as, for example, the location on the form 200 of the selection areas 202.

The MRCI 206 may also contain payment information for the postal service or a private carrier that is contracted as a mail processor. In some situations, the sender, as a courtesy to the recipient, will provide postage for return of the business reply mail, i.e., form 200. In this case the MRCI 206 would contain all necessary information for effective accounting and transfer of funds from the sender to the carrier service. Such information could include, for example, the sender's mailing account identity and a postage amount, based on a rate agreed to by the sender and carrier service, for the business reply mail piece that includes the form 200. If the sender utilizes a permit mail account, the MRCI 206 could also contain all necessary information for the permit account to allow the carrier service to bill the sender. In the case where the sender prepays for postage, the processing of claiming a refund for any mail pieces not returned is simplified by the present invention. For example, since each reply mail piece that is returned from its recipient will be scanned by the carrier service (as described below), an accurate record of each returned reply mail piece is obtained. For any reply mail pieces for which the sender has pre-paid for return postage that have not been returned, the sender can request a refund for the postage amount. The carrier service, based on the total number of reply mail pieces for which the sender has pre-paid and the number of reply mail pieces returned, will be able to easily calculate if the refund request is valid and accurate.

It should be noted that the processing instructions included in the MRCI 206 that correspond to each possible selection provided to the recipient may not be similar for all recipients. For example, the processing instructions could be tailored to a specific recipient based on historical response activity of that recipient. Thus, for recipients that are categorized as "preferred customers," the processing instructions that correspond to a selection may not be the same for an identical selection provided to a different recipient. For example, the electronic address of the sender or sender's agent could be different based on the recipient's history of response activity.

It should be understood that the type and amount of the data included in the MRCI 206 as provided above are exemplary only, and the present invention is not limited to those described. In practice, the type and amount of data included in the MRCI 206 may be greatly varied and typically depends upon the application. Typically, the data required for an application would not exceed more than a few hundred bytes. In addition, if security of the data included in the MRCI 206 is an issue, the data may be encrypted to protect it from unauthorized use, using, for example, one or more keys. In this case, an appropriate key management system must be established between the sender that generates the MRCI 206 and the processing system that will process reply mail pieces containing the form 200 (described below with respect to FIG. 4). Furthermore, other security techniques, such as, for example, digital signatures, could be utilized to secure the information in MRCI 206 if desired.

In the credit card remittance scenario previously described, the information contained in the MRCI 206 could include, for example, the recipient's credit card account number 212, a payment account associated with the recipient, such as, for example, a checking account maintained by a financial institution, a unique identity of the invoice, an electronic address of the sender or a remittance processing banking agent, and a set of instructions that correspond with each one of the areas 202 that can be marked by the recipient. The payment account information could have been previously obtained from the recipient, or alternatively, gleaned from prior payment instruments provided by the recipient. Thus, for form 200, the MRCI 206 will have at least four sets of instructions, one to correspond to each of the options available for selection by the recipient. Based on the selection made by the recipient and marked in area 202, the corresponding set of instructions will indicate the actions to be taken to process the form 200 as described below.

Figure 3:
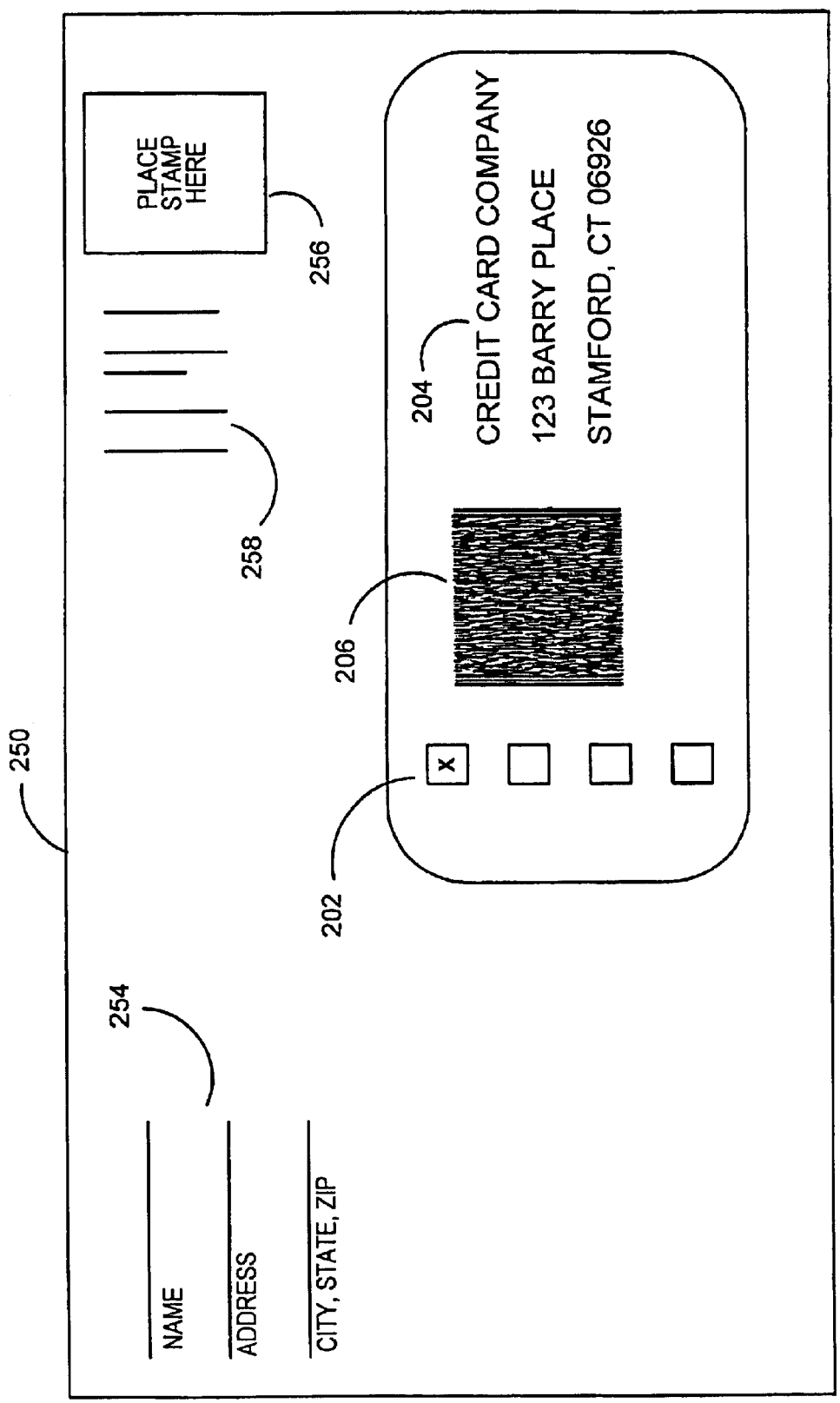
FIG. 3 illustrates an example of a business courtesy envelope including the form of FIG. 2.

FIG. 3 illustrates an example of a business courtesy envelope (BCE) 250 into which the form 200 of FIG. 2 has been inserted after completion by the recipient. It should be understood, of course, that form 200 could be integral with the BCE 250, such as, for example, a postcard or the like. BCE 250 includes a window portion 252 such that the area 202 to be marked by the recipient, the MRCI 206 and the destination address of the sender 204 are visible. BCE 250 can also be provided with an area 254 for the recipient's return address, and an area 256 for providing appropriate postage to the BCE 250. Generally, the recipient must affix the correct amount of postage to the BCE 250 in the form of adhesive stamps. Of course, if desired, postage for the return of BCE 250 could be provided by the sender and preprinted on the BCE 250 in the form of a business reply mail permit or digital postage mark by the mail processing system 108. Optionally, for additional security, if a digital postage mark (Information Based Indicia) is utilized, one or more portions of the MRCI 206 can be included in the digital indicium that evidences payment of postage. The information encoded in the MRCI 206, included in the digital indicium, can thus be protected against alteration or unauthorized access utilizing the information security techniques provided for the digital indicium, such as, for example, digital signatures and encryption. BCE 250 may also be provided with a facing identification mark (FIM) 258. FIM 258 is a pattern of vertical bars printed in the upper right area of a mail piece, to the left of the area 256. FIM 258 serves two major purposes. It allows mall pieces that do not contain luminescent stamps or meter imprints (such as business reply mail and official government mail) to be faced (oriented) and canceled (postmarked) by United States Postal Service (USPS) machinery. FIM 258 also permits business reply mail and courtesy reply mail to be separated from other letters and cards for direct processing to achieve faster processing times.

It should be noted that the entire MRCI 206 need not be provided on form 200. For example, if form 200 is to be used with a window envelope, such as BCE 250, then it is possible to include portions of the MRCI 206 on the face of the BCE 250. For example, the MRCI 206 could be partitioned into different types of information, such as, for example, fixed information and variable information. Fixed information would be any information that does not change regardless of the intended recipient, such as, for example, the electronic address of the sender. The fixed information could be printed on the BCE 250 in machine readable form. Variable information would be any information that is specific to the intended recipient, and thus may be different for each recipient. The variable information would be contained within the MRCI 206 on the form 200. Partitioning the MRCI 206 has several advantages. For example, by removing the fixed information from the MRCI 206 and providing it on the face of BCE 250, there is more room within the MRCI 206 on form 200 to include other information. This allows the MRCI 206 to include as much recipient specific information as possible, thereby increasing the usefulness of the MRCI 206. Furthermore, the additional space within the MRCI 206 on form 200 could be utilized to contain processing instructions corresponding to additional options made available to the recipient.

Figure 4:
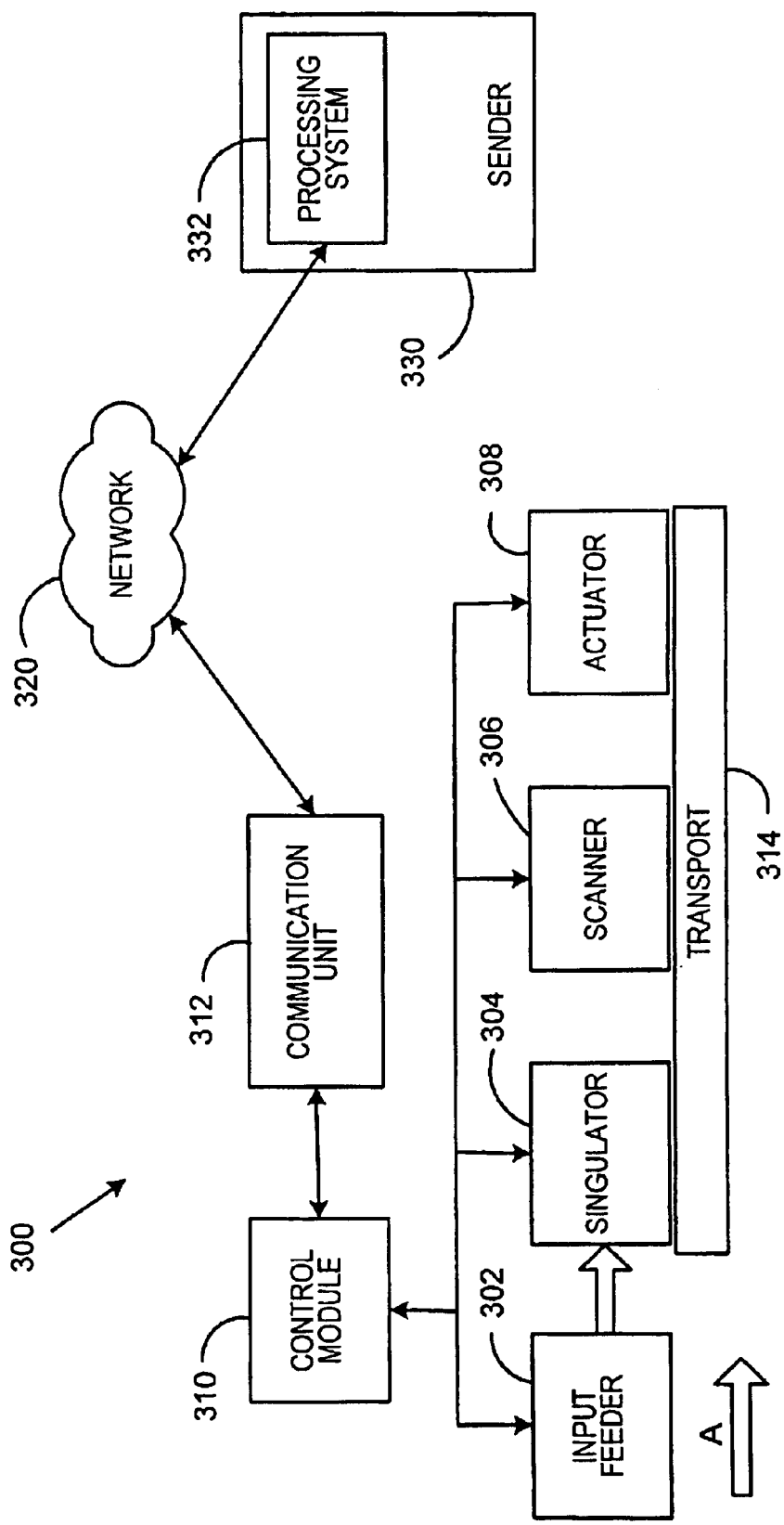
FIG. 4 is a block diagram of a processing system for processing business reply mail pieces according to the present invention.

Referring now to FIG. 4, a block diagram of a processing system 300 for processing business reply mail pieces, such as BCE 250, according to the present invention is shown. System 300 is preferably installed at mail processing stations, such as, for example, at mail induction centers operated by a postal or private carrier where mail is first inducted into the mail stream for delivery. System 300 could be integrated with the functions of a facer/canceller system utilized by the postal carrier for orienting and postmarking mail pieces based on the FIM. Alternatively, system 300 could be downstream from a facer/canceller system to which business reply mail and courtesy reply mail is directed from the facer/canceller. System 300 could also be installed at a private business office and used by the business to process business reply mail pieces being returned from a recipient that are delivered to the business by a postal or private carrier. System 300 includes a plurality of modules that perform various functions on mail pieces as they are fed through the system 300 in a path of travel as indicated by arrow A by a transport mechanism 314, such as, for example, belts or rollers. The processing system 300 includes an input feeder module 302, a singulator module 304, a scanner module 306, an actuator module 308, and a control module 310. Control module 310 includes a processing system, such as, for example a general or special purpose computer or the like and provides the main control of the functioning of system 300. A communication unit 312 is operatively coupled to the control module 310. The communication unit 312 is coupled to a private or public communication network 320, such as, for example, the internet. A processing system 332 of sender 330 is also coupled to the network 320, thereby allowing system 300, via communication unit 312, to communicate with the processing system 332 of sender 330.

Operation of the system 300 according to the present invention will now be described with respect to the BCE 250 of FIG. 3 and form 200 of FIG. 2. After the recipient has completed the form 200 and taken any other actions necessary for return of the BCE 250, such as, for example, enclosing a check, applying postage, etc., the recipient places the BCE 250 into the mail stream for return to the sender. The mail pieces are collected and brought to an induction site for processing by the postal or private carrier. Bundles of mail pieces (not shown) for induction are loaded by an operator into the processing system 300 at the input feeder module 302. The input feeder module 302 advances the mail pieces toward the singulator module 304 where the mail pieces are separated and fed one-by-one (one at a time) to the scanner 306 by the transport mechanism 314.

The scanner module 306 is positioned adjacent to the path of travel on the transport mechanism 314 so that mail pieces may be scanned and/or imaged as they are fed downstream by the transport mechanism 314. Optionally, the scanner module 306 can include a scanner on each side of the path of travel so that: (i) both sides of the mail piece may be scanned, if necessary; and/or (ii) depending upon the orientation of the mail piece, information from the side of the mail piece requiring scanning may be scanned in the event that only one side of the mail piece requires scanning. Generally, any conventional scanner, whether based on laser, CCD or some other technology, may be employed.

The scanner 306 scans the BCE 250 and obtains the information from the selection area 202 marked by the recipient, the MRCI 206, and any other information that may be specified by the MRCI 206. The scanned information is sent to the control module 310 for interpretation. If the MRCI 206 is encrypted, control module 310 will decrypt the MRCI 206. Control module 310, based on the selection made by the recipient and the corresponding instructions included in MRCI 206, will then process the information and the BCE 250 accordingly. Processing the information includes, for example, instructing the communication unit 312 to electronically send one or more data elements of the MRCI 206 to the electronic address specified in the MRCI 206. In addition, the control module 310 will provide instructions to the actuator unit 308 for processing the BCE 250. For example, actuator unit 308 can be instructed to divert the BCE 250 from the normal processing flow for mail pieces, or to continue with the normal processing flow (resulting in the BCE 250 eventually being delivered to the sender).

For example, with respect to the form 200 illustrated in FIG. 2, suppose the recipient marked the option for providing full payment (as shown in FIG. 3). Control module 310, upon determining that the full payment option was selected by the recipient, will then interpret the instruction data that corresponds to this selection that is encoded in the MRCI 206. The instruction data corresponding to this selection that is encoded in the MRCI 206 instructs the control module 310 to electronically send, utilizing an address in the MRCI 206 and the communication unit 312, the recipient's payment account number, the bill identity and a full payment code to the processing system 332 of the sender 330 (or to a remittance processing agent of the sender 330), along with any other information necessary, while proceeding with the normal mail piece processing activities (e.g. sorting, transportation and delivery) for the BCE 250. If the recipient marks the area corresponding to the minimal payment, the control module 310 will then interpret the instruction data corresponding to this selection that is encoded in the MRCI 206. The instruction data corresponding to this selection encoded in the MRCI 206 instructs the control module 310 to electronically send, utilizing an address in the MRCI 206 and the communication unit 312, the recipient's account number, the bill identity and a minimal payment code to the processing system 332 of the sender 330 (or to a remittance processing agent of the sender 330), while proceeding with normal mail piece processing activities. If the recipient marks an area corresponding to one of the other options, the corresponding instruction data encoded in the MRCI 206 instructs the control module 310 to proceed with the normal mail piece processing activities, i.e., the BCE 250 must be delivered to the sender 330 and the BCE 250 processed in a conventional manner. In this manner, in the case of full or minimal payment (which constitute approximately 99% of all encountered situations) the sender 330, or the sender's remittance processing agent, receives all of the information, in computerized format, required for efficient processing of the information contained within the BCE 250 long before the physical mail item, i.e., BCE 250, is received through the normal mail delivery process. This saves the cost of additional manual or automatic processing of the BCE 250 by the sender 330, as well as allowing for significant float benefits to the sender 330 due to the reduced processing time, at almost no additional cost to the sender 330 or postal carrier. The physical mail piece, i.e., BCE 250, when received by the sender 330, can be archived and retrieved, if necessary, to facilitate potential dispute resolution between the sender 330 and the recipient.

While the above example has been illustrated with respect to a credit-card remittance scenario, it should be understood that the present invention is not so limited and can be used with any type of business reply mail. For example, the process for promotional mail containing solicitations for purchases works similarly as described above. Since the merchant can receive all of the information, in computerized format, required for efficient processing of the information contained within the reply mail returned by the recipient long before the physical mail item, i.e., the reply mail piece, is received through the normal mail delivery process, the present invention provides substantial savings and other benefits to the merchant. The instruction data encoded into MRCI 206 provides indications of all the possible output activities that might possibly be taken based upon one or more of the selections made by the recipient. For example, the instruction data may specify any of the following: customer care follow up activities, dispatch of requested materials to the recipient; billing of the recipient's account, and the like. Those skilled in the art will recognize that due to the wide range of business reply mail, the instruction data is quite varied and its exact makeup does not constitute part of the present invention.

As discussed above, the control module 310 serves to coordinate activities among the various modules of the processing system 300. Also, the control module 310 serves as an interface with the operator by providing messages to and receiving input from the operator. As a result, the control module preferably includes a display (CRT, LCD, or the like) (not shown) and an input device (keypad, keyboard, touch screen, mouse, or the like) (not shown). Therefore, those skilled in the art will recognize that the control module 310 may employ any suitable combination of computer hardware and software to facilitate the operation, storage, access and processing of information and various other computer based communications that are required.

Figure 5:
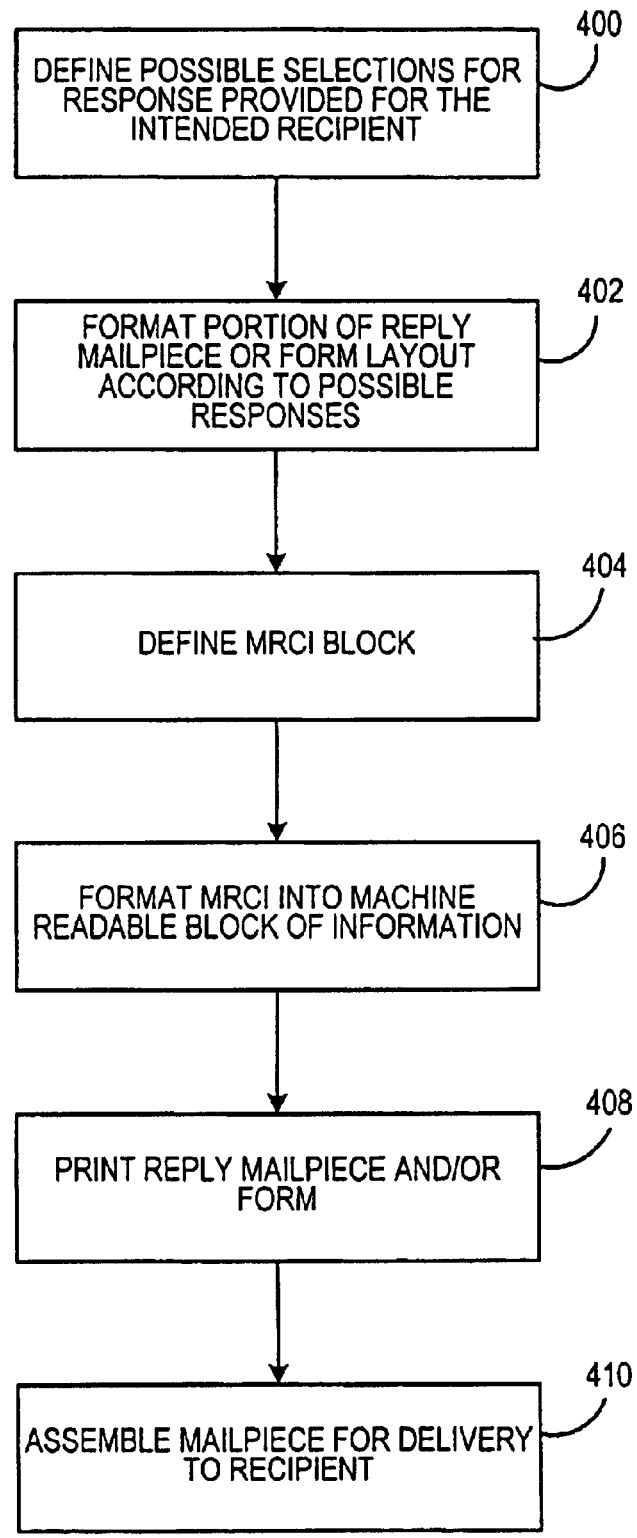
FIG. 5 illustrates in flow chart form the process of generating an MRCI according to the present invention.

Reference is now made to FIG. 5 where there is illustrated in flow chart form the process of generating a reply mail piece including the MRCI 206 according to the present invention. This process is performed by the sender, utilizing the system 100 previously described with respect to FIG. 1. The sender defines the possible selections for response that will be provided to the intended recipient in step 400. In step 402, a portion of the form 200, or reply mail piece if the form is integral to the reply mail piece, is formatted according to selection to be provided to the recipient, such as, for example, by providing one or more boxes or selection areas 202 as shown in FIG. 2. The MRCI 206 is defined at 404, based on the processing instructions corresponding to each possible response, along with other information required based on the application. As previously noted, the processing instructions could also be based on historical response activity of the intended recipient. At 406, the MRCI 206 is formatted into a machine-readable block of information as previously described. Optionally, in step 406 the information may be encrypted. At 408 the form 200 (or reply mail piece if integral with form 200) is printed, including the MRCI 206. At 410, all documents to be sent to the recipient, including, for example, the form 200, the BCE 250 for return of the form 200, promotional material, etc., are assembled for delivery to the recipient.

Figure 6:
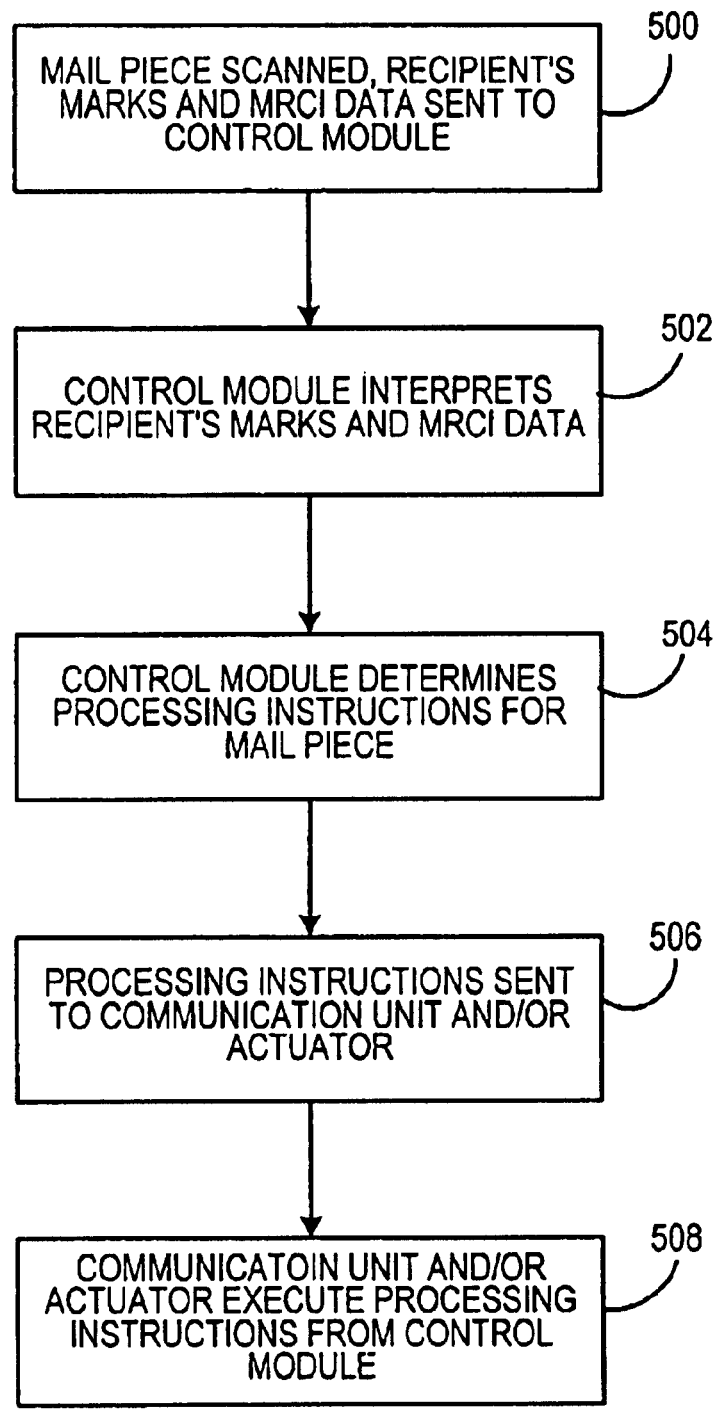
FIG. 6 illustrates in flow chart form the processing of a business reply mail piece according to the present invention.

Reference is now made to FIG. 6 where there is illustrated in flow chart form the processing of a business reply mail piece, such a BCE 250, as performed by system 300 of FIG. 4 according to the present invention. At 50, the mail piece, e.g., BCE 250, is scanned and all required information including the recipient's marks from area 202 and the MRCI 206 are captured and sent to the control module 310. At 502, the control module 310 interprets the data contained in the recipient's marks from area 202 and MRCI 206. If the data contained within MRCI is encrypted, the control module 310 will decrypt the data. Alternatively, an image of the entire BCE 250 could be obtained and control module 310 could utilize the image of the BCE 250 to interpret the data contained in the recipient's marks from area 202 and MRCI 206. At 504, the control module 310 determines the processing instructions for the BCE 250 based on the recipient's marks and the corresponding instruction data in MRCI 206. At 506, the processing instructions for the BCE 250 are sent to the communication unit 312 and the actuator 308. At 508, the communication unit 312 and the actuator 308 execute the required instructions from the control module 310. For example, communication unit 312 may be asked to send the recipient's identity (e.g., account number), mail item identity, the recipient's mark (indicative of the recipient's choice), together with a digital image of the mail item, date/time stamp of the scanning event and identity of the system 300 to the electronic address of the sender. Similarly, the actuator 308 may be asked to divert the BCE 250 for special processing or proceed with a normal processing path. For example, the recipient may by mistake make incorrect marks on the envelope or document, mark several conflicting marks, or provide no marks at all. In these exceptional cases the control module 310 will instruct the actuator 308 to divert the mail piece for special processing or continue with normal mail flow without engaging the communication unit 312 at all.

Based on the above description and the associated drawings, it should now be apparent that the present invention improves many aspects of the processing of business reply mail. According to the present invention, the automatic processing of a business reply mail piece is based on one or more selections made by the recipient to rapidly acquire the information that the business reply mail piece contains and allow for early initiation of appropriate follow-up activity.

Many features of the above embodiments represent design choices selected to best exploit the inventive concepts as implemented in a particular business reply mail processing environment as pertaining to traditional response card type business reply mail. However, those skilled in the art will recognize that various modifications and adaptations can be made without departing from the spirit of the present invention. For example, if the business reply mail piece is a postcard, it may be desirable to store a complete image of the postcard and destroy/recycle the postcard without ever delivering the physical postcard to the sender 330. It may also be desirable to provide authentication for the image. Thus, the image may be secured by employing a suitable encryption technique. A digital signature, originating from a certificate authority such as Verisign Inc., of the image may be stored along with the image so that a high degree of confidence that the image has not been altered is achieved.

Therefore, the inventive concept in its broader aspects is not limited to the specific details of the preferred embodiments described above, but is defined by the appended claims and their equivalents.

What is claimed is:

1. A method for generating a business reply mail piece comprising:
   determining at least one possible response for an intended recipient;
   determining processing instructions for the business reply mail piece that correspond to the at least one possible response;
   defining control information based on the determined processing instructions;

formatting the control information into a machine readable block; and printing the business reply mail piece, including the at least one possible response for the intended recipient and the machine readable block of control information.

2. The method of claim 1, wherein defining control information further comprises:

defining control information based on an identification of the business reply mail piece.

3. The method of claim 1, wherein formatting the control information further comprises:

formatting the control information into a two dimensional barcode.

4. The method of claim 1, wherein formatting the control information further comprises:

encrypting at least a portion of the control information.

5. The method of claim 1, further comprising:

including at least a portion of the control information in an indicium that evidences payment of postage for the business rely mail piece.

6. The method of claim 1, wherein determining processing instructions further comprises:

determining processing instructions based in part on historical response activity of the intended recipient.

7. The method of claim 1, wherein formatting the control information further comprises:

formatting the control information and evidence of postage payment for the business reply mail piece into a machine readable block.

8. The method of claim 1, wherein defining control information based on the determined processing instructions further comprises:

defining a first portion of the control information and a second portion of the control information, wherein the first portion of the control information is printed in a first location and the second portion of the control information is printed in a second location.

9. The method of claim 8, wherein the first location is on a form associated with the business reply mail piece and the second location is on an envelope into which the form is intended to be inserted.

10. The method of claim 1, wherein defining control information further comprises:

defining control information based on an identification of the intended recipient.

11. The method of claim 10, wherein the identification of the intended recipient includes an account number associated with the intended recipient.

12. A business reply mail piece, comprising:

a plurality of selection areas, each of the plurality of selection areas being associated with a respective option available to a recipient; and control information including a plurality of processing instructions for the business reply mail piece, each of the plurality of processing instructions corresponding to a respective one of the plurality of selection areas, each of the plurality of processing instructions providing instructions related to processing of the business reply mail piece when returned by a recipient based on a selection made by the recipient.

13. The business reply mail piece of claim 12, wherein the control information is a two dimensional barcode.

14. The business reply mail piece of claim 12, wherein the control information further includes an identification of the business reply mail piece.

15. The business reply mail piece of claim 12, wherein at least a portion of the control information is encrypted.

16. The business reply mail piece of claim 12, wherein at least a portion of the control information is included in an indicium that evidences payment of postage for the business reply mail piece.

17. The business reply mail piece of claim 12, wherein the control information further includes evidence of postage payment for the business reply mail piece.

18. The business reply mail piece of claim 12, wherein the control information further includes information related to a location of the plurality of selection areas on the business reply mail piece.

19. The business reply mail piece of claim 12, wherein the control information further includes an identification of the recipient.

20. The business reply mail piece claim 19, wherein the identification of the recipient includes an account number associated with the recipient.

21. The business reply mail piece of claim 20, wherein the account number is for a payment account.

22. The business reply mail piece of claim 20, wherein the account number is for a credit card account.

* * * * *